Patented Mar. 25, 1924.

1,487,764

UNITED STATES PATENT OFFICE.

ALBERT L. STILLMAN, OF PLAINFIELD, NEW JERSEY, ASSIGNOR TO THE GENERAL FUEL BRIQUETTE CORP., OF NEW YORK, N. Y., A CORPORATION OF NEW YORK.

METHOD OF BRIQUETTING PEAT OR HUMUS.

No Drawing.   Application filed December 8, 1922.   Serial No. 605,707.

*To all whom it may concern:*

Be it known that I, ALBERT L. STILLMAN, a citizen of the United States, and resident of Plainfield, county of Union, State of New Jersey, have invented a certain new and useful Improvement in Methods of Briquetting Peat or Humus, of which the following is a specification.

My invention relates to briquetting methods and has for its object to provide a novel and improved method of briquetting peat or humus in an economical and efficient manner and so to produce a briquet capable of use as fuel and having a relatively high heat value. Other more specific objects of the invention will appear from the description hereinafter and the features of novelty will be pointed out in the appended claims.

In carrying out my improved method, the peat or humus is won from the bog in the customary manner, by shovel or excavator, and if roots and fibre are present therein the mass is macerated or cut up in any convenient manner as by means of knives; if no roots and fibre are present in the mass this maceration may be omitted. The mass of peat or humus, either free from roots and fibre or with the latter in a macerated condition is then dried preferably by being spread out and subjected to the action of the sun; the drying process may extend over a period of from one to six weeks, this depending somewhat on the initial condition of the peat when the same is spread. At any rate the drying is continued until practically all moisture, excepting that which is contained in the peat cells, is removed, the moisture content being in this way reduced from a point ranging from 80% to 90% to a point ranging from 30% to 40%. The dried peat or humus is then subjected to a wringing pressure and coincidentally formed into briquets for instance by being passed through a suitable briquetting machine. The wringing action to which the peat or humus is subjected serves to bruise and open the aforesaid cells and to liberate the moisture contained therein, whereby a very soggy briquet is produced. This soggy briquet is so weak in its structural characteristics that the utmost care must be observed in handling it, in order to avoid disintegration thereof; preferably this soggy briquet is preliminarily hardened for instance by being carried on a suitable belt for an hour or so.

After having received this preliminary drying the briquettes are again spread out and subjected to a further drying preferably by the action of the sun. At this stage a very curious phenomenon occurs, in that the briquettes shrink and harden to such a degree that they may be thrown about to a very considerable extent without injury or damage. The shrinkage which occurs amounts to approximately 25% but the proportions of the original briquet are substantially preserved.

By bruising and opening the peat cells the latter become chemically active to water and form a hydrolized cellulose which acts as a cement or glue similar to the well known flour paste and which constitutes a binder whereby the structure of the briquet is maintained.

The briquettes resulting from the improved method are extremely hard and dense and have the advantage of being in a form capable of being shovelled; the briquettes are useful as a fuel and possess approximately three-fourths of the heating value of good bituminous coal. The briquet is economical to produce and by providing its own binder does away with the cost of a separate binder. The method of production is simple and requires no complicated machinery nor the supervision of skilled operators.

Various changes in the specific method described may be made within the scope of the claims without departing from the spirit of my invention.

I claim:—

1. The method of briquetting peat which consists in macerating a mass of peat, reducing the moisture content from a point ranging from 80 to 90% to a point ranging from 30 to 40% by drying in the sun without liberating the moisture contained in the peat cells, subjecting the dried mass to a wringing pressure to bruise and open the peat cells and thereby liberate the moisture contained therein to form a binder and coincidentally briquetting said mass to produce soggy briquettes, hardening said soggy briquettes preliminarily and drying and shrinking the briquettes to a final state by exposure to the sun.

2. The method of briquetting peat which